US009280669B2

United States Patent
Chauhan et al.

(10) Patent No.: US 9,280,669 B2
(45) Date of Patent: Mar. 8, 2016

(54) SYSTEMS, METHODS AND COMPUTER READABLE MEDIA FOR CALCULATING A SECURITY INDEX OF AN APPLICATION HOSTED IN A CLOUD ENVIRONMENT

(71) Applicant: Infosys Limited, Bangalore (IN)

(72) Inventors: Nitin Singh Chauhan, Hyderabad (IN);
Ashutosh Saxena, Hyderabad (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/891,222

(22) Filed: May 10, 2013

(65) Prior Publication Data

US 2013/0305376 A1    Nov. 14, 2013

(30) Foreign Application Priority Data

May 11, 2012    (IN) .......................... 1883/CHE/2012

(51) Int. Cl.
*H04L 29/06* (2006.01)
*G06F 21/57* (2013.01)

(52) U.S. Cl.
CPC .................................. *G06F 21/577* (2013.01)

(58) Field of Classification Search
CPC .................................................. G06F 21/577
USPC ......................................................... 726/25
See application file for complete search history.

(56) References Cited

U.S. PATENT DOCUMENTS

| 2009/0228967 A1 * | 9/2009 | Gbadegesin et al. ............. 726/8 |
| 2010/0132016 A1 | 5/2010 | Ferris |
| 2011/0072489 A1 | 3/2011 | Parann-Nissany |
| 2011/0239270 A1 * | 9/2011 | Sovio et al. ........................ 726/1 |
| 2013/0111547 A1 * | 5/2013 | Kraemer ............................ 726/1 |
| 2013/0247135 A1 * | 9/2013 | Kundu et al. ...................... 726/1 |
| 2013/0247203 A1 * | 9/2013 | Nakawatase et al. ........... 726/25 |
| 2013/0298244 A1 * | 11/2013 | Kumar et al. .................... 726/25 |
| 2014/0173694 A1 * | 6/2014 | Kranz ............................... 726/4 |

FOREIGN PATENT DOCUMENTS

WO    2010135068 A1    11/2010

OTHER PUBLICATIONS

Barton, B., "Security and Privacy in Cloud Computing", retrieved from http://middarchive.middlebury.edu/cdm/ref/collection/scholrestrct/id/22, on May 7, 2015 (Abstract Only) (2011).
Barton, B., "Security and Privacy in Cloud Computing", May 2010.

* cited by examiner

*Primary Examiner* — Jeffrey Pwu
*Assistant Examiner* — William Corum, Jr.
(74) *Attorney, Agent, or Firm* — LeClairRyan, a Professional Corporation (57) ABSTRACT

The present invention provides a method and system for calculating a security index of an application hosted in a cloud environment. The application is mapped to a cloud service provider of the cloud environment, and a set of security controls and a set of security metrics applicable for the application are identified. The set of security controls and the set of security metrics are encapsulated into a security profile object by a security control module. A set of values of the set of security metrics are retrieved from the cloud service provider, by a cloud probe module, and the security index of the application is calculated.

15 Claims, 6 Drawing Sheets

SYSTEMS, METHODS AND COMPUTER READABLE MEDIA FOR CALCULATING A SECURITY INDEX OF AN APPLICATION HOSTED IN A CLOUD ENVIRONMENT

This application claims the benefit of Indian Patent Application Filing No. 1883/CHE/2012, filed May 11, 2012, which is hereby incorporated by reference in its entirety.

FIELD OF THE INVENTION

The present invention relates generally to a method and system of measuring a security level of an application hosted in a cloud environment. More specifically, the present invention relates to a method and system for calculating a security index of the application hosted from a current value of security metrics of the cloud environment.

BACKGROUND

In a cloud environment, security of an application hosted within the cloud environment, is a great challenge, to organizations, seeking to comply with security guidelines and gain confidence of third party auditors and users. Lack of secure handling practices, at technical or operational level by a cloud service provider, and dependency on web based service and third parties can lead to compromise of confidential information such as credit card, SSN data of customers associated with the application. Due to poor security controls followed by cloud service providers, such compromise of confidential information, could lead to huge financial loss and distrust amongst the customers. In order to combat such security threats, a set of security controls could be given to the customer, to enable the customer to evaluate the security level of the application hosted on the cloud service provider. However, existing cloud service providers are unwilling to share information of cloud resources, systems, and of outgoing information. As a result, it is difficult to measure a security level of the application hosted on such cloud service providers' systems.

Hence, there is a need for a new method and system for effectively calculating a security level of the application hosted in the cloud environment. The alternative method must provide a set of tailored security controls and security metrics for the application, and means for probing the cloud environment for values of the set of security metrics. Further, the alternative method must enable calculation of the security level of the application hosted on the cloud environment from the values of the set of security metrics and the tailored set of security controls.

Thus a unique system and method for calculating the security index of the application hosted on the cloud environment is proposed.

SUMMARY

The present invention provides a system and method for calculating a security index of an application hosted in a cloud environment. In accordance with a disclosed embodiment, the system may include an application module, configured to receive an identifier of the application, and a list of cloud service providers from a user. The system may further, include a security control module, configured to receive a set of security controls as applicable to the application, assign a set of security metrics to the set of security controls and create a security profile object of the application. Further, the system shall include a cloud probe module, is configured to retrieve a set of values, of the set of security metrics, from the cloud environment, and a measurement engine, configured to calculate the security index of the application, based on the security profile object and the retrieved set of values of the set of security metrics.

In an additional embodiment, a method for calculating a security index of an application hosted in a cloud environment is disclosed. In accordance with the additional embodiment, the method may include receiving an identifier of the application and a list of cloud service providers form a user. The application may be mapped to a cloud service provider. Based on the mapped cloud service provider and the application, a set of security controls, and a set of security metrics as applicable for the application may be identified. The set of security controls and the set of security metrics shall be encapsulated into a security profile object of the application. A set of values of the set of security metrics may be retrieved from the cloud environment and utilized for the calculating the security index of the application, based on the security profile object.

These and other features, aspects, and advantages of the present invention will be better understood with reference to the following description and claims.

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-program products for calculating a security index of an application hosted in a cloud environment. The methods and systems disclosed herein develop a set of security controls and a set of associated security metrics of the application for the purpose of measuring the security index. Well known industry practices such as National Institute of Standards and Technology (NIST), Organization for Economic Co-operation and Development (OECD), and Software Engineering Institute (SEI) guidelines can be utilized for identifying the set of security metrics. The set of security metrics can be assigned to the set of security controls defined for the application. The systems can be further configured to receive the values of the set of security metrics from third party systems, and probe the cloud environment for retrieving the values. An intermediate component known as a cloud security server can be configured to retrieve values of the set of security metrics from the cloud environment.

Figure 1:
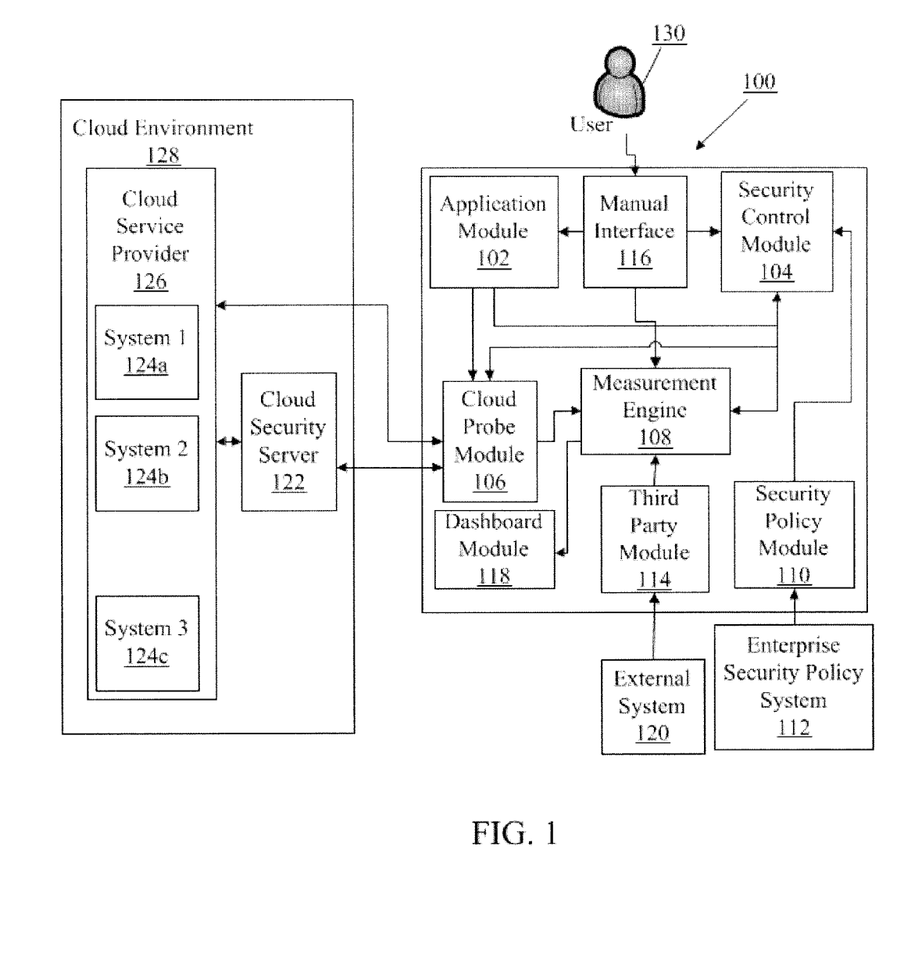
FIG. 1 shows an exemplary system for calculating a security index of an application hosted in a cloud environment.

FIG. 1 illustrates an exemplary system 100 in which various embodiments of the invention can be practiced. The exemplary system 100 includes an application module 102, a manual interface 116, a security control module 104, a cloud probe module 106, a measurement engine 108, a dashboard module 118, a third party module 114, a security policy module 110, a cloud security server 122, and a cloud environment 128, for a process of calculating a security index of an application hosted in the cloud environment 128. The cloud environment 128, includes a list of cloud service providers, wherein each cloud service provider viz. 126 may include one or more systems 124a to 124c. The system 100, can be configured to interface with an external third party system 120, and an enterprise security policy system 112. In an embodiment of the present invention, the application module 102 is configured receive an identifier of the application and a list of cloud service providers from a user. The application module 102, is further configured to provide the user with an option to manage a list of applications and the list of cloud service providers. The user can add, modify, and delete one or more entries in the list of cloud service providers and the list of applications. Further, a deployment type of a cloud service provider can be set by the user. The deployment type can include one of the following; Infrastructure as a Service (IaaS), Platform as a Service (PaaS), and Software as a Service (SaaS). The application module 102, is further configured to map the identifier of the application to a cloud service provider viz. 126, where the mapped cloud service provider 126 is the cloud service on which the application shall be hosted. The security control module 104, can be configured to receive a set of security controls at an enterprise level and selectively identify a subset of security controls, from the set of security controls, applicable for the application, based on a type of the application. The security control module 104, is further configured to enable the user to add one or more security controls and modify existing security controls, based on the deployment type of the cloud service provider, on which the application shall be hosted. Further, the security control module 104, can be configured to define a set of parameters also known as a set of security metrics, for each identified security control, in order to evaluate the security index of the each security control. Well known industry practices such as National Institute of Standards and Technology (NIST), Organization for Economic Co-operation and Development (OECD), and Software Engineering Institute (SEI) guidelines can be utilized for identifying the set of security metrics. The user can assign a subset of security metrics from the identified set of security metrics to the each security control defined for the application. Further, the security control module 104, can be configured to enable the user to apply a weight factor for the each security control, based on a criticality factor of the each security control. The security control module 104, can be further configured to create a security profile object by encapsulating the set of security controls, the identified set of security metrics and the weight factor of the each security control, into the security profile object, and storing the security profile object in a memory of the system 100. The security profile object can be editable to allow the user for making changes that may be required while hosting the application on another cloud service provider. The security policy module 110, can be configurable to provide the set of security controls from an enterprise security policy system 112 for aligning. Usually, organizations, have a security policy, standards, and guidelines defined at an enterprise level. Such security policy, standards and guidelines can be stored the enterprise security policy system 112 such as a Governance Risk and Compliance-GRC system. In the disclosed embodiment, the enterprise security policy system 112 can also include a document that stores the security policy, standards and guidelines. The set of security controls of the application must align with the security policy, standards and guidelines. Hence, the security policy module 110, can be configured to provide an interface and connectivity to the enterprise security policy system 112, in order to fetch the security policy, standards and guidelines, that are applicable for the application.

In the disclosed embodiment, on retrieving the set of security controls, the cloud probe module 106, can be configured, to probe the one or more systems 124a-c of the cloud service provider 126, for retrieving a set of values of the set of security metrics. Instances of the one or more systems 124a-c of the cloud server provider 126 can include, support management systems such as anti-virus systems, patch management system, and log systems. A request to probe the one or more systems 124a-c can be sent to a cloud security server 122. The cloud security server 122, is usually deployed when certain cloud service providers do not permit direct connectivity to hosted cloud resources, and access to cloud systems. The provision to host the cloud security server 122, is usually agreed in Service Level Agreements. The cloud security server 122, can act as an intermediate server, between the cloud environment 128 and the system 100. The cloud security server 122, can authenticate the request to probe, and on authentication probe the one or more systems 124a-c, for the set of values. In order to retrieve the set of values, the cloud security server 122, can be further configured to capture a plurality of events related to the set of security controls from the one or more systems 124a-c, and calculate the set of values from the plurality of captured events. Alternatively, the cloud probe module 106, can be configured to generate a request to probe the one or more systems 124a-c, of the mapped cloud service provider 126, and access the one or more systems 124a-c, when the request is authenticated by the one or more systems 124a-c. In the alternate embodiment, where the cloud security server 122 is not essential, and hence, the authentication is preferably performed by the mapped cloud service provider 126 on the basis of a credential information of the user.

The third party module 114, can be designed to provide performance related information of the list of cloud service providers of the cloud environment 128. The third party module 114, can be configured to connect to independent information providers such as the external system 120, where the external systems, provide information about trends, security incidents, performance availability and other related information that may have impact on the set of values of the set of security metrics. The external system 120, shall provide a general information about a performance of the cloud service provider 126, and the security incidents that shall impact security of the application hosted on the one or more systems 124a-c of the cloud service provider 126. Further, the manual interface 114, is a module that provides an interface to the user, to input a metric data which can be used as an input to the measurement engine 108 for calculation of the security index. The metric data can include a status of the set of security controls, and the set of security metrics, and security control information. The security control information being obtained by assessment, audit, SLA, and such other provisions. The metric data usually includes data that could not be obtained by the cloud probe module 106, from the cloud environment 128. The measurement engine 108, is typically a mathematical module, configured to accept information from the cloud probe module, 106, the manual interface 116, and the third party module 114 for calculating the security index of the each security control. The calculation of the security index is performed based on inbuilt rules in the measurement engine 108, and the security profile object. For instance, the weighted mean of the set of retrieved values of the set of security metrics of a security control is calculated to obtain the security index of the security control. An equation 1, given below, illustrates the calculation of the security index of a security control designated as SIC_i, where SIC_i is a security index of control i, and I can vary from 1 to n, signifying 'n' number of security controls.

$$a.\ SIC_i = \frac{\sum_{j=1}^{k} M_j * WM_j}{\sum_{j=1}^{k} WM_j} \qquad 1$$

In the above equation, 'Mj' signifies a Security Metrics adherence value of metrics number 'j', 'WMj' is preferably a Security Metrics weightage of metrics number 'j', where 'j' can vary from 1 to 'k', 'k' being a number of a subset of metrics identified for the security control 'i'. Similarly, on calculating a security index $SIC_i$ of each security control, the security index of the application can be calculated, by assigning a weight factor to the calculated security index $SIC_i$ of the each security control, and calculating a weighted mean of the calculated security indexes of the set of security controls, as shown in the equation below:

$$SI = \frac{\sum_{i=1}^{n} SIC_i * WC_i}{\sum_{i=1}^{n} WC_i} \qquad 2$$

In the above equation SI refers to the security index of the application and $WC_i$ refers to a Security control weightage factor of the each security control. On calculating the security index of the application, the system 100, provides a dashboard module 118, for displaying a customized view comprising, the each security control, the values of the set of security metrics, the security index of the each security control and the security index of the application. The customized view can be changed as per a preference of the user.

Figure 2:
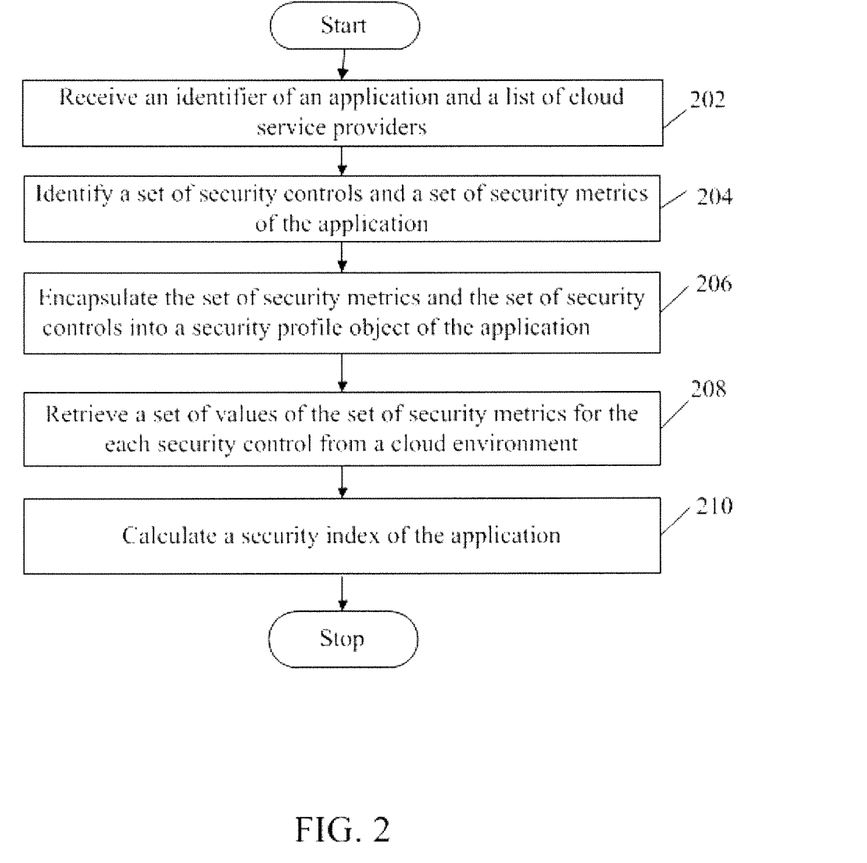
FIG. 2 is a flowchart illustrating an embodiment of a method of calculating a security index of an application hosted in a cloud environment.

FIG. 2 is a flowchart that illustrates a method performed in calculating a security index of an application hosted in a cloud environment in accordance with an embodiment of the present invention. At step 202, an identifier of the application and a list of cloud service providers of the cloud environment on which the application may be hosted, is received from a user. The user can add, delete and modify a set of information properties of the application. Further at step 204, a set of security controls and a set of security metrics as applicable for the application are identified from existing generalized security metrics that are recognized in industry. For instance, NIST, OECD and SEI guidelines illustrate certain generalized security metrics for a plurality of applications hosted in a cloud environment. A subset of security metrics can be assigned by the user to each security control. The set of security controls and the set of security metrics can be encapsulated into a security profile object of the application at step 206. Further, at step 208, a set of values of the security metrics of the each security control, can be retrieved from a cloud environment. On retrieving the set of values, based on the security profile object and rules as laid down in the measurement engine, a security index of the each security control and based on the security index of the each security control, the security index of the application is calculated at step 210.

Figure 3A:
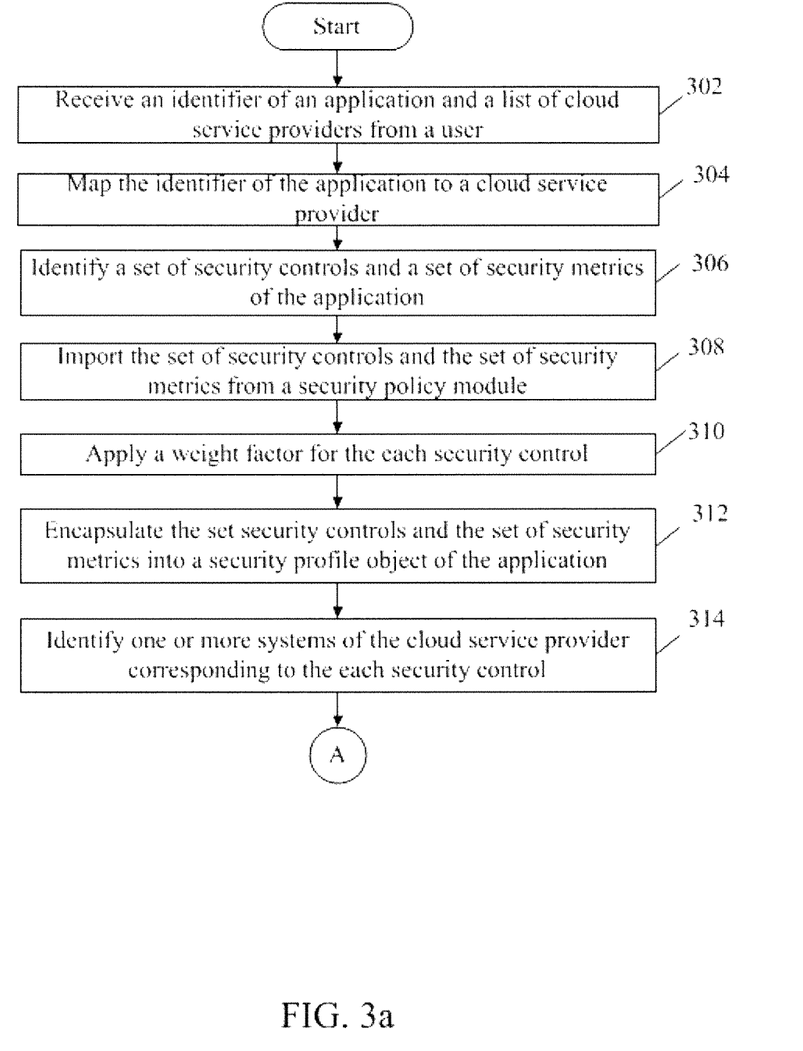
FIGS. 3A-C is a flowchart illustrating a preferred embodiment of a method of calculating a security index of an application hosted in a cloud environment.
Figure 3B:
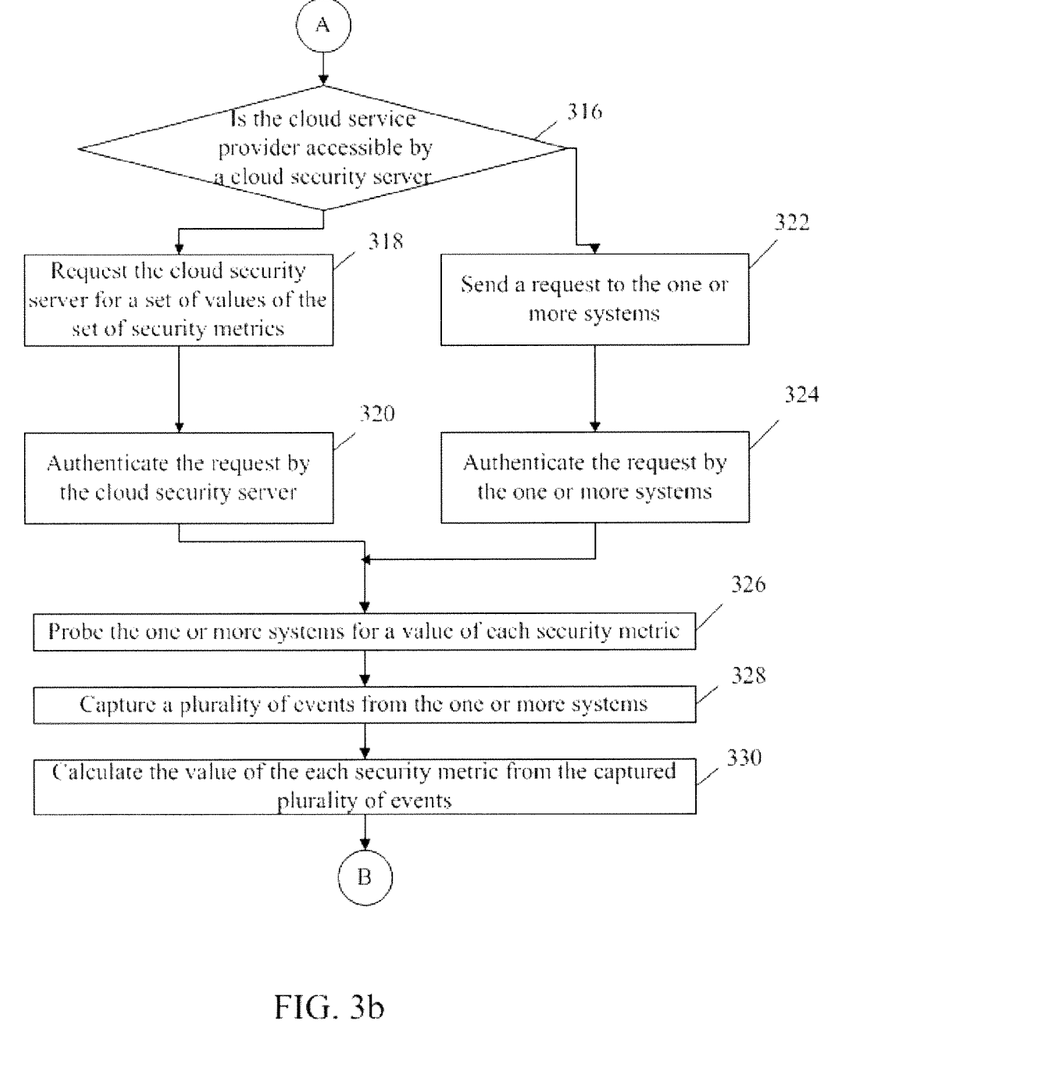
Figure 3C:
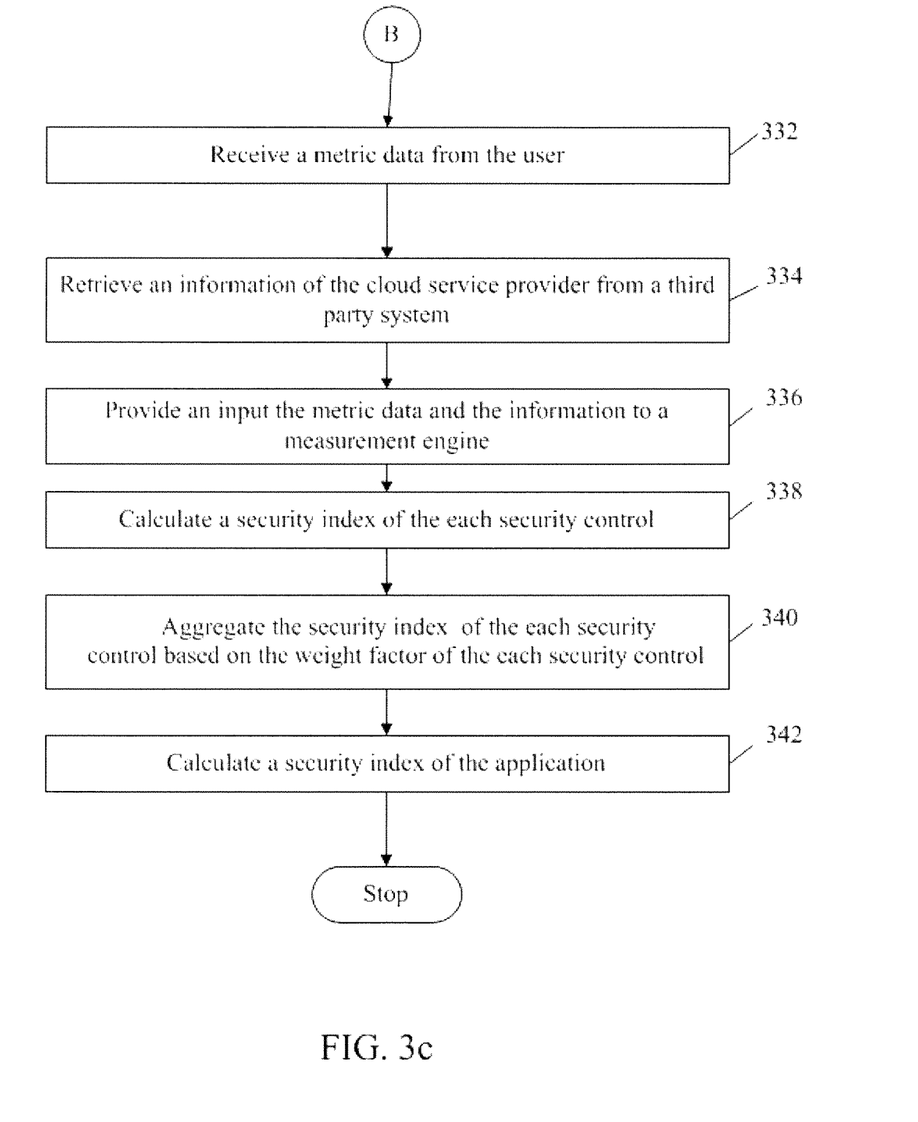

FIG. 3A-C illustrates an alternate embodiment of a method of practicing the instant invention. At step 302, an identifier of an application to be hosted in a cloud environment, and a list of cloud service providers of the cloud environment is received from a user. At step 304, the identifier of the application is mapped to a cloud service provider on which the application shall be hosted. Based on the cloud service provider and the application, a set of security controls, and a set of security metrics of the application, are identified at step 306, where each security control is assigned a subset of security metrics of the set of security metrics. At step 308, the identified set of security controls and the set of security metrics, are imported from a security policy module, in order to align the set of security controls as per the security policy of an organization, where the organization hosts the application in the cloud environment. Further, in order to develop a standard profile object, a weight factor is assigned to the each security control, at step 210, and the set of security controls, the set of security metrics and the weight factor of the each security control are encapsulated into a security profile object of the application at step 312. At step 314, one or more systems of the cloud service provider corresponding to the each security control, is identified. In an instance, the cloud service provider provides direct access and connectivity to its systems through a cloud security server, send a request to the cloud security server for a set of values of the set of security metrics at step 318. The cloud security server shall authenticate the request at step 320, and probe the one or more systems of the cloud service provider for the set of values at step 326. Alternatively, in an instance where the cloud service provider provides direct access to its cloud resources and systems to the user, a request for the set of values may be sent directly to the one or more systems at step 322. Based on a credential information of the user, the request shall be authenticated by the one or more systems at step 324, and based on the authenticated request criteria, the one or more systems shall be probed for the value of the each security metric at step 326. At step 328, a plurality of events, from the one or more systems, are captured, and based on the captured plurality of events, the value of the each security metric is calculated at step 330. Information that cannot be retrieved from the cloud service provider may be manually inserted by the user as metric data at step 332. Further, general performance information of the cloud service provider can be obtained from a third party system at step 334. The metric data and the performance information can be provided as an input to a measurement engine at step 226, for calculation of the security index. Additionally, the set of values of the set of security metrics can also be provided as an input to the measurement engine. Based on the security profile object, and a set of rules defined in the measurement engine, the set of values of the set of security metrics, the metric data and the information from the third party system, a security index of the each security control can be calculated at step 338. Further at step 340, the security index of the each security control, is aggregated, based on a weight factor of the each security control. The security index of the application is calculated at step 342, as a result of the aggregation of the security index of the each security control. The security index thus calculated, shall provide a precise measure of the security level, of the application hosted in the cloud environment.

Figure 4:
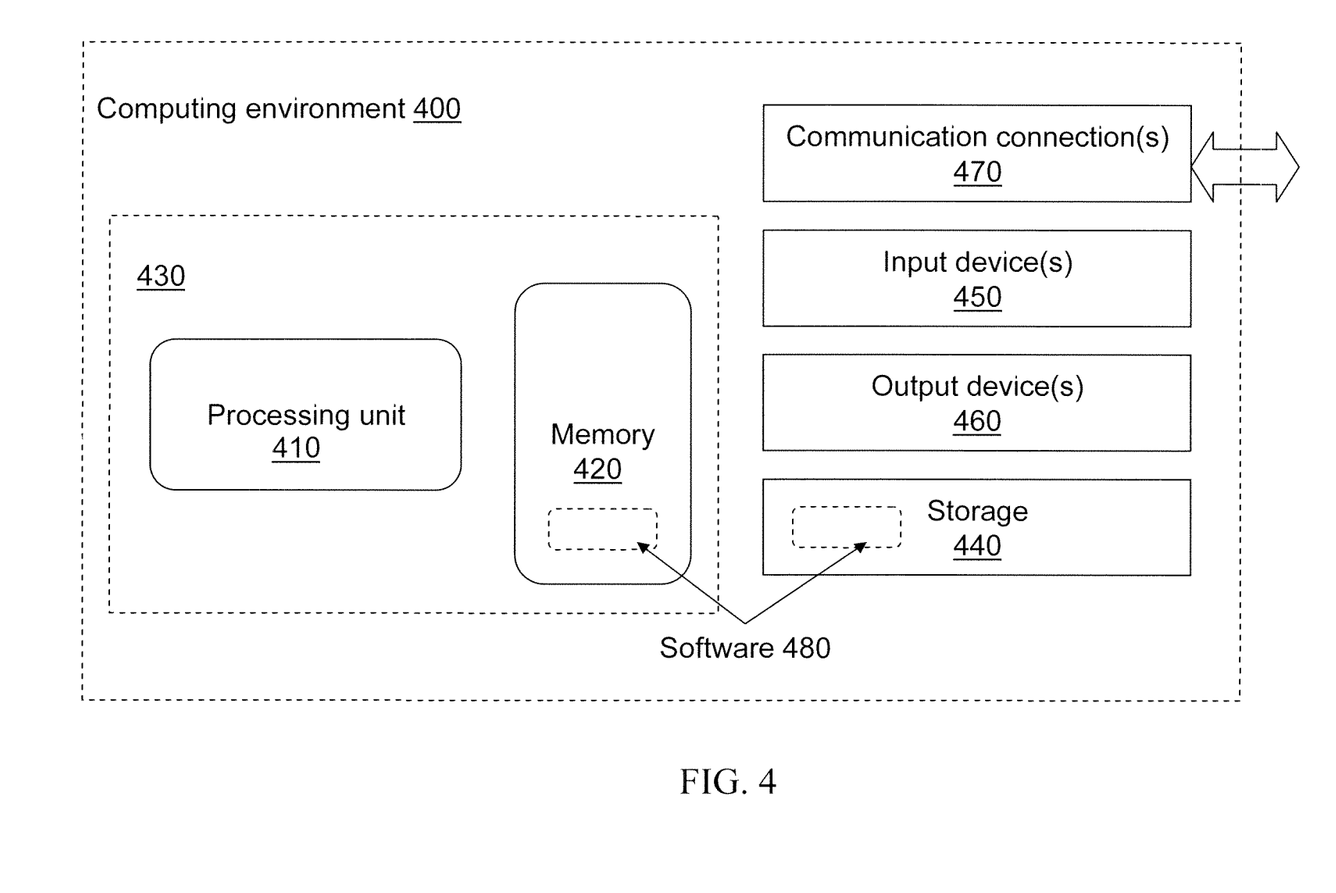
FIG. 4 illustrates a generalized example of a computing environment 400.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 440, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

What is claimed is:

1. A security analysis system, comprising a processor and a memory coupled to the processor which is configured to be capable of executing programmed instructions comprising and stored in the memory to:

receive an identifier of an application hosted in a cloud environment, a list of cloud service providers in the cloud environment, and a set of security controls;

identify a set of security metrics and assign at least a subset of the security metrics to each of the security controls, wherein each of the security controls is defined for the application based on a type of the application and corresponds with an enterprise level security policy of an organization providing the application;

retrieve a set of values for each of the security metrics from one or more systems of at least one of the cloud service providers in the cloud environment;

generate a security control index for each of the security controls based on the retrieved values for the assigned at least a subset of security metrics, wherein the security control index for each of the security controls is determined as $$\frac{\sum_{j=1}^{k} M_j * WM_j}{\sum_{j=1}^{k} WM_j},$$

where j varies from 1 to k, k is a number of the security metrics in the assigned at least a subset of security metrics, $M_j$ is the value for the $j^{th}$ security metric in the assigned at least a subset of security metrics, and W is a weight value; and
generate and output an application security index for the application based on an average of a weighted sum of the security control indices.

2. The system of claim 1, wherein the processor coupled to the memory is further configured to be capable of executing at least one additional programmed instruction further comprising and stored in the memory to:
map the identifier of the application to the at least one cloud service provider.

3. The system of claim 1, wherein the set of security controls is received from at least one of an enterprise security policy system or a user.

4. The system of claim 1, wherein the processor coupled to the memory is further configured to be capable of executing at least one additional programmed instruction further comprising and stored in the memory to:
apply a weight factor to each security control; and
encapsulate the set of security controls, the set of security metrics and the weight factor of the each security control.

5. The system of claim 1, further comprising outputting a dashboard graphical user interface comprising a customizable view for displaying one or more of the security controls, the values of the security metrics, the security control indices or the application security index.

6. A method for analyzing application security, the method comprising:
receiving, by a security analysis computing device, an identifier of an application hosted in a cloud environment, a list of cloud service providers in the cloud environment, and a set of security controls defined for the application;
identifying, by the security analysis computing device, a set of security metrics and assigning at least a subset of the security metrics to each of the security controls, wherein each of the security controls is defined for the application based on a type of the application and corresponds with an enterprise level security policy of an organization providing the application;
retrieving, by the security analysis computing device, a set of values for each of the security metrics from one or more systems of at least one of the cloud service providers in the cloud environment;
generating, by the security analysis computing device, a security control index for each of the security controls based on the retrieved values for the assigned at least a subset of security metrics, wherein the security control index for each of the security controls is determined as $$\frac{\sum_{j=1}^{k} M_j * WM_j}{\sum_{j=1}^{k} WM_j},$$

where j varies from 1 to k, k is a number of the security metrics in the assigned at least a subset of security metrics, $M_j$ is the value for the $j^{th}$ security metric in the assigned at least a subset of security metrics, and W is a weight value; and
generating and outputting, by the security analysis computing device, an application security index for the application based on an average of a weighted sum of the security control indices.

7. The method as set forth in claim 6, further comprising mapping, by the security analysis computing device, the identifier of the application to the at least one cloud service provider.

8. The method as set forth in claim 6, wherein the set of security controls is received from at least one of an enterprise security policy system or a user.

9. The method as set forth in claim 6, further comprising:
applying, by the security analysis computing device, a weight factor to each security control; and
encapsulating, by the security analysis computing device, the set of security controls, the set of security metrics and the weight factor of the each security control.

10. The method as set forth in claim 6, further comprising outputting, by the security analysis computing device, a dashboard graphical user interface comprising a customizable view for displaying one or more of the security controls, the values of the security metrics, the security control indices, or the application security index.

11. A non-transitory computer readable medium having stored thereon instructions for analyzing application security comprising executable code which, when executed by a processor, causes the processor to perform steps comprising:
receiving an identifier of an application hosted in a cloud environment, a list of cloud service providers in the cloud environment, and a set of security controls defined for the application;
identifying a set of security metrics and assigning at least a subset of the security metrics to each of the security controls, wherein each of the security controls is defined for the application based on a type of the application and corresponds with an enterprise level security policy of an organization providing the application;
retrieving a set of values for each of the security metrics from one or more systems of at least one of the cloud service providers in the cloud environment;
generating a security control index for each of the security controls based on the retrieved values for the assigned at least a subset of security metrics, wherein the security control index for each of the security controls is determined as $$\frac{\sum_{j=1}^{k} M_j * WM_j}{\sum_{j=1}^{k} WM_j},$$

where j varies from 1 to k, k is a number of the security metrics in the assigned at least a subset of security metrics, $M_j$ is the value for the $j^{th}$ security metric in the assigned at least a subset of security metrics, and W is a weight value; and generating and outputting an application security index for the application based on an average of a weighted sum of the security control indices.

12. The non-transitory computer readable medium as set forth in claim 11, further having stored thereon instructions comprising executable code which, when executed by the processor, causes the processor to perform at least one additional step comprising mapping the identifier of the application to the at least one cloud service provider.

13. The non-transitory computer readable medium as set forth in claim 11, wherein the set of security controls is received from at least one of an enterprise security policy system or a user.

14. The non-transitory computer readable medium as set forth in claim 11, further having stored thereon instructions comprising executable code which, when executed by the processor, causes the processor to perform additional steps comprising:
  applying a weight factor to each security control; and
  encapsulating the set of security controls, the set of security metrics and the weight factor of the each security control.

15. The non-transitory computer readable medium as set forth in claim 11, further having stored thereon instructions comprising executable code which, when executed by the processor, causes the processor to perform at least one additional step comprising outputting a dashboard graphical user interface comprising a customizable view for displaying one or more of the security controls, the values of the security metrics, the security control indices, or the application security index.

* * * * *